United States Patent [19]

Sievers et al.

[11] 4,415,849

[45] Nov. 15, 1983

[54] ALTERNATOR PROTECTION SYSTEM

[75] Inventors: Kirk A. Sievers, Roselle; Dean C. Santis, Winfield, both of Ill.

[73] Assignee: Motorola, Inc., Schaumburg, Ill.

[21] Appl. No.: 361,715

[22] Filed: Mar. 25, 1982

[51] Int. Cl.³ .................. H02J 7/14; H02H 7/06; H02K 11/00
[52] U.S. Cl. .................................. 322/99; 322/33; 361/20
[58] Field of Search ............... 322/28, 33, 99; 361/20, 361/21, 25; 310/68 C; 320/35, 48, 64

[56] References Cited

U.S. PATENT DOCUMENTS

| 3,600,661 | 8/1971 | Briggs et al. | 322/33 X |
| 3,938,005 | 2/1976 | Cummins | 322/28 X |
| 4,315,204 | 2/1982 | Sievers et al. | 322/99 X |

Primary Examiner—R. J. Hickey
Attorney, Agent, or Firm—Margaret M. Parker; James W. Gillman; James S. Pristelski

[57] ABSTRACT

The protection system includes an over-temperature warning lamp in addition to the usual charge indicator lamp. Both lamps light at ignition as a test, then both go out. If the alternator should fail, both lamps again light. If the alternator overheats, only the warning lamp is lighted and current to the field coil is removed.

6 Claims, 2 Drawing Figures

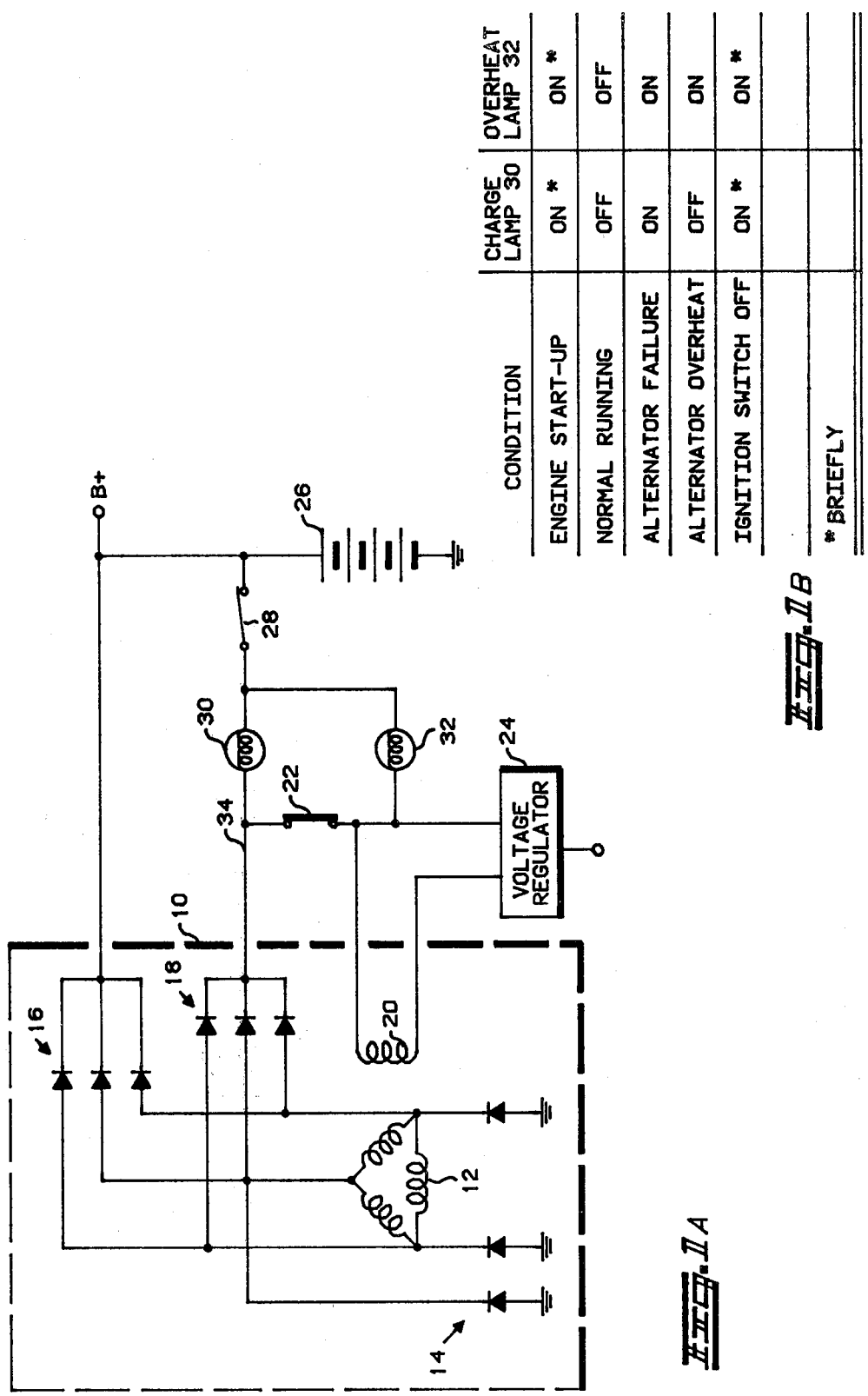

ALTERNATOR PROTECTION SYSTEM

BACKGROUND OF THE INVENTION

This invention relates to the field of battery charging circuits, and, more particularly, to the provision for a warning indicator when the power source overheats.

In the field of battery charging devices, including alternators and regulating circuits, it is well known to use a thermal switching element which will open the circuit of the field coil when the device overheats. In one such device, a lamp is turned on if the thermal switch is activated but, in this circuit, the lamp is put across the supply and thus requires the use of a rather expensive large resistor in series with the lamp. In another device for providing relief for an overheat condition in large motor windings, a thermal switch is coupled to a bimetallic element positioned within the windings. WHen the switch is closed, it completes a circuit including a lamp, a siren and a resistor plus, if desired, a stack of carbon disks with resistance which decreases as the temperature goes up. None of the known arrangements provide for a separate warning lamp to indicate only a overheat condition. Overheating is particularly a problem in alternators operating in an excessively dusty environment; for example, in a tractor during harvest time.

SUMMARY OF THE INVENTION

It is an object, therefore, of the present invention to provide a protection and indication system which will differentiate between "charging" and "overheat" conditions.

It is another object to provide for indication of alternator failure.

It is a particular object to provide the desired protection system with a minimum of components and at minimum cost.

These objects and others are provided in a circuit having a first lamp coupled in series with the ignition switch to be "on" only when the battery is supplying power. A thermal switch is positioned physically adjacent to the alternator, and electrically in series with the field coil, to remove field coil current in response to an overheated condition of the alternator. A second warning lamp is connected to the battery and the field coil in parallel with the first lamp and thermal switch combination, to be turned on when the thermal switch opens.

BRIEF DESCRIPTION OF THE DRAWINGS

FIG. 1a is a schematic diagram of a battery/alternator circuit including the present invention.

FIG. 1b is a lamp status chart for the various possible operating conditions for the circuit of FIG. 1a.

DETAILED DESCRIPTION OF A PREFERRED EMBODIMENT

FIG. 1a shows a typical battery/alternator circuit with the addition of the present invention and FIG. 1b displays the status of the lamps in FIG. 1a for easy reference. Within a dashed line 10 is shown an alternator including a three-phase winding 12, a diode trio 14 coupled to ground, a diode trio 16 coupled to B+, a diode trio 18 coupled to a field coil and thermal switch 22. Both the field coil 20 and the switch 22 are coupled to a voltage regulator 24. The diode trio 16 is also coupled to charge a battery 26. Ignition switch contacts 28 are coupled to supply battery current to the field coil 20 during the start-up period of the alternator, thus briefly illuminating a "charge" lamp 30, as is known. Since the thermal switch 22 is closed, a lamp 32 will also be illuminated briefly. Lamp 32 is termed the "overheat" lamp.

As soon as the voltage at a point 34 which is the output of the diode trio 18 approximates the battery voltage, both of the lamps 30 and 32 will be extinguished, indicating normal running conditions.

If the alternator 10 should fail to operate; e.g., as from a broken wire, both of the lamps 30 and 32 will illuminated until the ignition switch 28 is opened. However, if the alternator should begin to overheat for any reason, the thermal switch 22 will open the field coil power supply line, limiting alternator power output. The "charge" lamp 30 will not be illuminated since no significant voltage is applied across that lamp. The "overheat" lamp 32, however, is now coupled between the battery 26 and the voltage regulator 24 so lamp 32 is illuminated until the ignition switch 28 is opened. Thus, when only the "overheat" lamp 32 is illuminated, this constitutes an indication that alternator overheating has occurred and that power limiting is in effect. Frequently such overheating is due to a clogged alternator air intake.

There has been shown and described a protection system for an alternator which, with the addition of one extra indicator lamp provides an "overheat" indication along with and separate from the usual "alternator failure" indication. Other embodiments and modifications are possible and it is intended to cover all those which fall within the scope of the appended claims.

What is claimed is:

1. An alternator protection system comprising:
first terminal means for supplying to a load a first rectified alternator output current at a predetermined voltage;
second terminal means for supplying to a load a second rectified alternator output current at the predetermined voltage;
first indicator means coupled to the second terminal means;
thermal switching means coupled to the second terminal means;
field coil means coupled to the thermal switching means;
regulator means coupled to the thermal switching means and the field coil means for regulating the voltage in the field coil means;
second switching means coupled between the first indicator means and the first terminal means; and
second indicator means coupled across the series combination of the first indicator means and the thermal switching means.

2. An alternator protection system according to claim 1 wherein the first and second indicator means are lamps.

3. An alternator protection system according to claim 1 and wherein the load is a battery of electrical cells.

4. An alternator protection system according to claim 1 and wherein the thermal switching means is positioned physically adjacent to a portion of said alternator.

5. An alternator protection system according to claim 4 wherein the thermal switching means includes a thermistor.

6. An alternator protection system according to claim 1 wherein the second switching means is a temporary contact switch.

* * * * *